-358. 241
12-75 28342

Feb. 18, 1975 T. C. LASSWELL ET AL Re. 28,342

PRECOATED PLUG

Original Filed Aug. 19, 1969

INVENTORS
TULL C. LASSWELL
JOHN L. MONIER
BY Hauke, Gifford & Patalidis
ATTORNEYS

United States Patent

Re. 28,342

Reissued Feb. 18, 1975

28,342

PRECOATED PLUG

Tull C. Lasswell, 230 Pawnee Path, Lake Orion, Mich. 48035, and John L. Monier, 1968 Harwood Drive, Oxford, Mich. 48051

Original No. 3,635,369, dated Jan. 18, 1972, Ser. No. 851,261, Aug. 19, 1969. Application for reissue Aug. 3, 1973, Ser. No. 28,342

Int. Cl. B65d *41/00*

U.S. Cl. 220—358 7 Claims

Matter enclosed in heavy brackets [ ] appears in the original patent but forms no part of this reissue specification; matter printed in italics indicates the additions made by reissue.

ABSTRACT OF THE DISCLOSURE

A plug adapted to close off core openings in an internal combustion engine is precoated with a plastic which forms a fluidtight seal between the peripheral surface of the plug and the core opening upon insertion of the plug therein. The plug is preferably coated with a solution of a polyvinylidene chloride in cyclohexanone which is cured by heating for 20 minutes at 160° F. The thickness of the plastic coating may be doubled by heating the coated plug for 10 minutes at [350° F.] *250° F.*

BACKGROUND OF THE INVENTION

1. Field of the Invention

This invention relates generally to plug members adapted to provide a seal closure in an apertured workpiece, and more particularly, to a precoated plug for sealing an opening for the core holes in water jackets of internal combustion engines and other similar manufacturing holes, and to a method for applying a plastic coat to the peripheral surface [os] *of* such plug members.

[DESCRIPTION OF THE PRIOR ART]

*2. Description of the Prior Art*

*The* [the] cylinder block of an internal combustion engine is usually provided with a water jacket which in many cases is cast integral with the cylinder. This jacket generally has a plurality of holes passing therethrough to the outside which have been provided for removing the sand cores after the block has been cast. [They] *The holes* are ordinarily provided with a sealing plug secured therein by friction so as to provide an enclosed cavity.

It may also be necessary to drill access holes or passages in a casting in order to permit internal machining or to provide for cross-connecting internal fluid carrying passages and the like. It is usually necessary to close off these access holes or passages in order to preclude introduction of foreign matter internally of the part and to prevent fluid leakage therefrom. [On] *One* of the current methods of closing off such access holes in passages has been the forcing of a short metal rod into the end of the passage. Although this method is satisfactory in certain applications, it is quite unsatisfactory under circumstances where fluid under pressure is subsequently introduced into the passage inasmuch as the rod may be forced out of the hole or the passage by the pressurized fluid.

A veriety of methods have been employed to provide a satisfactory sealing plug which is reliable and inexpensive. Such prior methods have included the use of a plug having a diameter larger than the opening it is to close, at least to the extent that there will be a relatively large compressive engagement between the plug and the opening. In order to insert the rod into the opening without cracking the workpiece it is sometimes necessary to heat the area of the workpiece about the opening or to cool the rod to cryogenic temperature prior to insertion. This type of sealing means results in a relatively expensive operation and is difficult to use [on] *in* high-volume production. Other methods have consisted in tapping the access hole and threading a bolt or threaded plug therein. Such methods are relatively time consuming and therefore expensive from a production standpoint, and it is also possible that fluid pressure behind the plug may result in [leadage] *leakage* past the threads to the outside of the casting.

Specifically in the automotive industry, core openings are generally sealed by means of plugs which are press fitted within the openings. Prior to the press fitting of the plugs within the openings, the openings are coated with an adhesive material by an operator. Although such a method is satisfactory, it does require two steps, that is, the manual coating of the opening and the insertion of the plug generally by means of an automatic plug-inserting machine. Since the coating is applied manually this sometimes leads to an improper coating on the part [by] *of* the operator, and thus a proper seal between the plug and the opening is not achieved. Furthermore, existing adhesive coatings utilized in the automotive industry tend to become brittle and chip off in a relatively short period, thus losing the desired seal. Such existing adhesive coatings are subjected to oil, oil additives, water, antifreeze and high temperature, all of which lead to a short sealing life.

It would therefore be very desirable to provide a plug for sealing an access hole in a metallic casting and the like in which the plug has been precoated with a plasticlike material so as to provide and insure a fluidtight seal upon insertion of the plug within the opening.

SUMMARY OF THE INVENTION

The present invention which will be described in greater detail hereinafter comprises a metallic plug adapted to be inserted within an aperture or opening formed within a metallic casting and the like. The peripheral surface of the metallic plug which engages the walls of the opening is precoated with a plastic material prior to insertion. The plastic coating is of such thickness that when the metallic plug is press fitted into the aperture of the metallic workpiece, the plastic coating fills any cracks within the wall of the aperture while at the same time interference between the plug and the walls of the opening tends to peel back a portion of the plastic coating such that the coating acts as a gasket between the two parts, thus forming a fluidtight seal to prevent introduction of foreign matter internally of the part and to preclude the passage of fluid leakage therefrom.

The plugs are precoated by applying a solution of a polyvinylidene chloride powder in a solvent, preferably cyclohexanone, to the engaging surface of the plug. The plug is then heated at a predetermined temperature for a predetermined peroid of time. For example, to obtain a 1-mil thickness on the peripheral surface of the plug, a mixture of 1 part by weight of the aforementioned powder to 2 parts of the solvent is applied to the plug surface and heated for 20 minutes at 160° F. However if the same composition by weight of powder to solvent is heated at [350° F.] *250° F.* for 10 minutes the thickness of the resultant plastic coating will be double that of the plastic coating obtained when heated at 160° F. for 20 minutes. Plugs coated in the manner described herein are resistant to oil, oil additives, water, antifreeze and are capable of withstanding substantially higher temperature than the hereinbefore mentioned prior art devices, thus a long sealing life is insured.

It is therefore an object of this invention to provide a simple, efficient and inexpensive precoated plug having a long life, for use in closing an apertured workpiece.

It is also an object of this invention to provide a method for precoating such a plug.

DESCRIPTION OF THE DRAWING

The several objects, advantages and applications of the present application will become apparent to those skilled in the art when the accompanying description of some examples of the best modes contemplated for practicing the invention is read in conjunction with the accompanying drawing wherein like reference numerals refer to like parts and in which.

DESCRIPTION OF THE PREFERRED EMBODIMENTS

Figure 1:
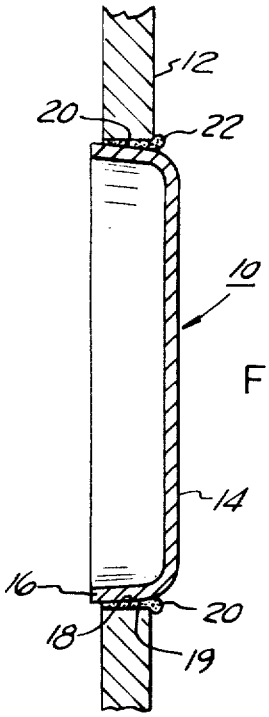
FIG. 1 is a fragmentary sectional view of a water jacket wall of an internal combustion engine illustrating an example of a sealing plug constructed in accordance with the present invention.

Referring to FIG. 1 there is shown one example of a precoated plug 10 inserted in the water jacket wall 12 of an internal combustion engine. The plug 10 is cup-shaped having a bottom portion 14 and a cylindrical side flange portion 16. The plug 10 is adapted to be mounted in a circular opening 18 formed in the water jacket wall 12. The side flange portion 16 is so designed as to be slightly tapered outwardly from the bottom portion 14, this taper of the flange being illustrated in an exaggerated form in FIG. 1. The outside of the peripheral surface 19 of the side flange 16 is precoated with a plastic material 20 which will be described in greater detail hereinafter. The outside diameter of the side flange 16 is so sized relative to the inner diameter of the opening 18, and the thickness of the plastic coating 20 is such as to permit the precoated plug 10 to be inserted forcefully within the opening 18 such that a portion of the plastic coating 20 is peeled back and acts as a gasket as is illustrated at 22. The combination of the press fit of the side flange 16 against the inner diameter of the opening 18 and the plastic coating 20 results in providing a fluidtight seal between the outer periphery of the side flange 16 and the opening 18 so as to prevent introduction of foreign matter internally of the water jacket and to preclude fluid leakage therefrom. The plug 10 is preferably of a metallic material such as steel and has a predetermined amount of resiliency in the tapered side flange 16 such that when it is inserted within the hole 18 the side flange 16 tends to exert an outward force against the opening 18, to further maintain the fluidtight seal. As viewed in FIG. 1 the precoated plug is inserted leftwardly into the opening 18 such that the bottom portion 14 is external of the water jacket.

Figure 2:
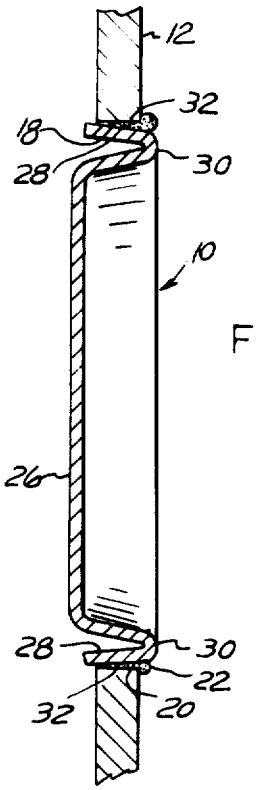
FIG. 2 is a similar fragmentary sectional view of a water jacket wall showing another example of a sealing plug constructed in accordance with the present invention.

Referring to FIG. 2 for a description of another example of a precoated plug constructed in accordance with the present invention there is shown a plug member 10 including a cup shaped portion 26 having its side flange 28 reversely bent at 30 to provide an outer peripheral wall 32 which extends outwardly and tapers slightly outwardly from the bend 30, as illustrated in FIG. 2 in an exaggerated form. The tapered outer peripheral wall 32 is precoated with the plastic coating 20 which will be described in greater detail hereinafter.

The plug member 10 of FIG. 2 is adapted for use in the same manner as hereinbefore described with respect to the plug 10 of FIG. 1 namely it is adapted for mounting in the circular opening 18 formed in the water jacket 12. The outer diameter of the outer peripheral wall 32 and the thickness of the plastic coating 20 are so dimensioned that when the plug 10 is forcefully press fitted into the opening 18, a portion of the plastic material is peeled back to form a gasket which is illustrated at 22, thus creating a fluidtight seal between the wall 12 of the opening 18 and the peripheral wall 32 of the plug 10. In a similar manner as the plug 10 of FIG. 1 the plug member 10 of FIG. 2 is made of a metallic material, such as steel and has a slight resiliency in the peripheral wall 32 thereof which causes it to the exert an outwardly force against the surface of the opening 18, thus to further insure a fluidtight seal between the wall 12 and the plug 10. As viewed in FIG. 2, the precoated plug is inserted leftwardly into the opening 18 such that the bottom portion 26 is internal of the water jacket.

Figure 3:
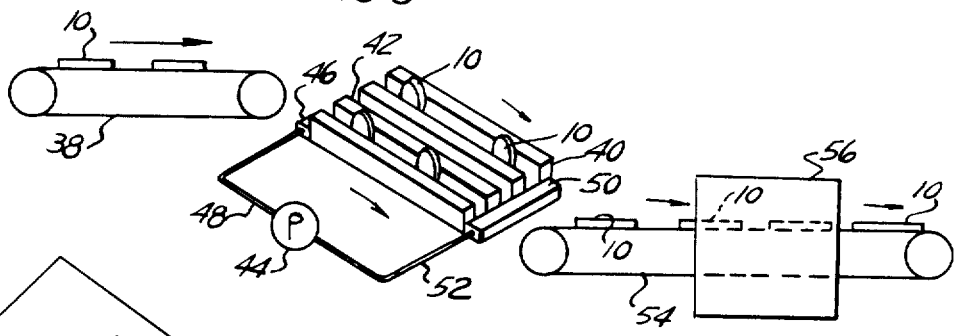
FIG. 3 is a diagrammatic illustration of an example of one method employed in practicing the present invention.

The plastic coating 20 applied to the peripheral surface of the plug member 10 is initially in a liquid form. Referring to FIG. 3, for a schematic illustration of one example of the application of the plastic material 20 to the plugs, there is shown a conveyor belt 38 which carries the uncoated plugs 10 to an inclined trough 40. The uncoated plugs are transferred from the conveyor belt to the trough 40 by any suitable means (not shown) such as manually or by gravity.

The trough 40 is comprised of a plurality of narrow channels 42 which are adapted to guide the plugs 10 as they roll along their outer surfaces. The trough is partially filled with the liquid plastic material and as the plugs roll down the inclined trough 40 under the influence of gravity their peripheral surface is coated with the liquid plastic material. The liquid plastic material is recirculated in the trough passageways 42 by means of a pump, illustrated schematically at 44. The pump 44 supplies the liquid plastic material to a distributing element 46 via a conduit 48. The liquid plastic material flows through the trough passageways 42 wherein the peripheral surfaces of the plugs are coated. The liquid is received by a liquid-collecting element 50 and returned to the pump 44 via a conduit 52 for reuse within the trough 40.

The plugs leave the trough 40 and are transferred by any suitable means (not shown) such as manually or by gravity, to a conveyor belt 54 which in turn carries the coated plugs 10 to a heated drying area indicated schematically at 56 wherein the coated plugs are heated at a predetermined temperature for a predetermined period as described in the several examples hereinafter. The conveyor belt 54 carries the plugs past the heated drying area 56 where they are unloaded and packaged in the customary manner.

Figure 4:
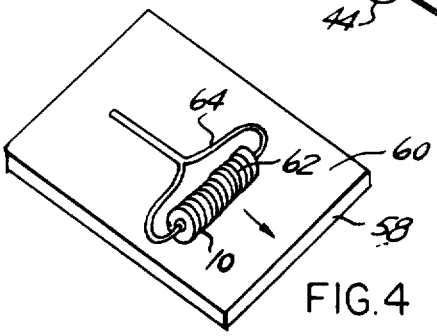
FIG. 4 is a diagrammatic illustration of another example of a method employed in practicing the present invention.

Referring to FIG. 4, for a schematic illustration of another example of the application of the plastic material 20 to the plug, there is shown a coating pad 58, the surface 60 of which consists of a fabric impregnated with liquid plastic material 20. The surface 60 may be initially impregnated with the liquid plastic material 20 by any suitable means (not shown) such as by painting, rolling or spraying the plastic material thereon. After subsequent use of the pad 58, the surface 60 is replenished in the same manner.

The plugs are stacked together on top of each other as illustrated in FIG. 4 to form a cylindrically shaped roller unit 62 which is maintained as a unit by means of a clamping device 64. The clamping device 64 is attached to the opposite ends of the roller unit 62 in such a manner as to provide sufficient clamping force against the stacked plugs to prevent their separation, while permitting the roller unit 62 to rotate about its longitudinal axis. The roller unit 62 is moved back and forth across the impregnated surface 60 by means of the clamping device 64 until the tapered peripheral surfaces of the plugs have been sufficiently coated.

The clamping device 64 may be manually moved across the surface 60 or actuated by suitable machinery (not shown).

After the plugs have been suitably coated with the liquid plastic material 20, they are placed on the conveyor 54 of FIG. 3 and dried in the heated area 56 in the same manner as hereinbefore described.

The plastic material is comprised preferably of a polyvinylidene chloride powder and the solvent cyclohexanone. However other solvents such as methol-ethyl-ketone and the like may be used with the polyvinylidene chloride powder.

EXAMPLE I

A plug similar to the types described hereinbefore was coated with a solution of 1 part by weight of polyvinylidene chloride powder and 2 parts by a weight of cyclohexanone. The coated plug was heated at 160° F. (*71° C.*) for 20 minutes and resulted in a 1 mil (*25 microns*) thickness of the plastic coating on the outer peripheral surface of the plug.

EXAMPLE II

A plug was coated with a solution composed of 1 part by weight of the polyvinylidene chloride powder and 1½ parts by weight of cyclohexanone solvent. The coated plug was heated at 160° F. (*71° C.*) for 20 minutes and resulted in a coated plug having a plastic coating of a thickness of 1½ mils (*38 microns*) on the peripheral edge surface of the plug.

EXAMPLE III

A plug was rolled through a solution of 1 part by weight of the polyvinylidene chloride powder and 1 part by weight of a cyclohexanone solvent. The coated plug was heated at 160° (*71° C.*) for 20 minutes, and resulted in a plastic coating of 2-mil (*50 microns*) thickness on the peripheral surface adge of the plug.

EXAMPLE IV

Each of the prior [examples] *EXAMPLES* I, II, III was repeated except the coated plug was heated at [350° F.] *250° F.* for 10 minutes. In each case the thickness of the resultant plastic coating on the plug was doubled, that is, when the plugs were heated at [350° F.] (*121°* C.) for 10 minutes in [example] *EXAMPLE* I and 2-mil (*50 microns*) thickness resulted, in [example] *EXAMPLE* II a 3-mil (*75 microns*) thickness resulted and in [example] *EXAMPLE* III a 4-mil thickness resulted.

EXAMPLE V

A group of plugs coated as described in each of the [examples] *EXAMPLES* I–IV were heated in an oven at [400° F.] *300° F.* for 3 minutes without any deterioration. A temperature of [400° F.] (*149° C.*) is substantially higher than the actual temperatures which such plugs are subjected to in automotive applications.

The resultant plastic which is precoated on the plugs is one that will adhere thereto, is nonsticky and pliable. A range from 1 to 6 mils. (*25 to 150 microns*) with 3 mils (*75 microns*) being typical, is representative of a sufficient thickness for the plugs so as to achieve the desired amount of sealing in the particular applications in which such plugs may be employed such as hereinbefore described.

Having thus described the invention, what is claimed is as follows:

1. A plug for closing an opening formed in a workpiece comprising a body member having a periphery of a shape which is complementary to that of said opening, and a plastic coating disposed on said periphery for creating a seal between said plug and said opening when said plug is positioned therein, said plastic coating being comprised of a polyvinylidene chloride and a solvent selected from the group consisting of methol-ethyl-ketone and cyclohexanone.

2. A plug for closing an opening formed in a workpiece comprising a body member having a periphery of a shape which is complementary to that of said opening, and a plastic coating disposed on said periphery for creating a seal between said plug and said opening when said plug is positioned therein, wherein said body member is cup-shaped, and has a substantially cylindrical outer periphery which is adapted to be closely fitted within said opening and wherein said plastic coating is plasticially deformed for creating a seal between said opening and the outer periphery of said plug.

3. A plug as claimed in claim 2, wherein the outer periphery of said cup-shaped member forms an edge which diverges outwardly from said cup-shaped member to engage said opening.

4. The plug as claimed in claim 2, in which said plastic coating is comprised of a polyvinylidene chloride and a solvent selected from the group consisting of methol-ethyl-ketone and cyclohexanone.

5. A plug for closing an opening formed in a workpiece comprising a body member having a periphery of a shape which is complementary to said opening, and a plastic coating disposed on said plug periphery for creating a seal between said plug and said opening when said plug is positioned therein, wherein said body member is cup-shaped with an edge reversely bent to form an outer peripheral wall, said outer peripheral wall having said plastic coating disposed thereon and said plug being press fitted within said opening wherein said plastic coating formed on said outer peripheral wall is plastically deformed creating a seal between said opening and said outer peripheral wall of said body member.

6. The plug as claimed in claim 5, wherein said reversely bent edge diverges outwardly from said cup-shaped body member to engage said opening.

7. The plug as claimed in claim 5, wherein said plastic coating is comprised of a polyvinylidene chloride and a solvent selected from the group consisting of methol-ethyl-ketone and cyclohexanone.

References Cited

The following references, cited by the Examiner, are of record in the patented file of this patent or the original patent.

UNITED STATES PATENTS 3,476,287 11/1969 Kinnavy ---------- 220—42 B

FOREIGN PATENTS 204,385 9/1923 Great Britain -------- 220—24

GEORGE T. HALL, Primary Examiner

U.S. Cl. X.R.

220—378